United States Patent
Madenokouji et al.

[11] Patent Number: 6,058,035
[45] Date of Patent: May 2, 2000

[54] METHOD AND APPARATUS FOR SUPPLYING AC POWER TO COMMERCIAL POWER LINE BY USING SUNLIGHT

[75] Inventors: Masaki Madenokouji, Saitama-ken; Keigo Onizuka, Gunma-ken; Hisashi Tokizaki, Gunma-ken; Isao Morita, Gunma-ken, all of Japan

[73] Assignee: Sanyo Electric Co., Ltd., Ohsaka-fu, Japan

[21] Appl. No.: 09/264,345

[22] Filed: Mar. 8, 1999

[30] Foreign Application Priority Data

Mar. 30, 1998 [JP] Japan .................................. 10-084681

[51] Int. Cl.⁷ .................................................. H02M 3/24
[52] U.S. Cl. ................................................................ 363/95
[58] Field of Search ............................... 363/95, 97, 131; 323/282, 283, 906

[56] References Cited

U.S. PATENT DOCUMENTS

| | | | |
|---|---|---|---|
| 4,472,641 | 9/1984 | Dickey et al. | 307/46 |
| 5,504,418 | 4/1996 | Ashley | 323/282 |
| 5,835,383 | 11/1998 | Onizuka et al. | 364/528.32 |
| 5,909,061 | 6/1999 | Sasaki et al. | 307/44 |

*Primary Examiner*—Matthew Nguyen
*Attorney, Agent, or Firm*—Knobbe, Martens, Olson & Bear LLP

[57] ABSTRACT

After starting the input of a switching signal to a booster circuit whose boosting rate is changeable in accordance with the duty ratio of the inputted switching signal and calculating the output power of an inverter circuit, which is connected to the subsequent stage of the booster circuit, from the output current of the inverter circuit, the target voltage after boosting by the booster circuit is obtained based on the output power. If the actual output voltage of the booster circuit is lower than the target voltage, the duty ratio of the above switching signal is increased, and if higher, the duty ratio of the above switching signal is decreased.

17 Claims, 7 Drawing Sheets

METHOD AND APPARATUS FOR SUPPLYING AC POWER TO COMMERCIAL POWER LINE BY USING SUNLIGHT

BACKGROUND OF THE INVENTION

1. Field of the Invention

The present invention relates to an apparatus for supplying AC power to a commercial power line by using sunlight. More particularly, the invention relates to an apparatus for supplying AC power to a commercial power line by using sunlight wherein the output power of a solar battery is boosted and then converted into AC power.

2. Description of the Related Art

Recently, attention has been given to a system for interconnecting other systems which connects an apparatus for supplying AC power to a commercial power line by using sunlight. In these other systems, DC power is outputted from a solar battery which is converted into AC power similar to commercial power by an inverter circuit or the like. Thus, a commercial power system may include solar power for household electric appliances and the like.

Some conventional apparatuses for supplying AC power to a commercial power line in an interconnection system boost the voltage of DC power outputted from a solar battery by a booster circuit such as a boosting chopper circuit. Then the boosted DC power into AC power with an inverter circuit. At this point, in the conventional apparatuses for generating electric power by using sunlight described above, the booster circuit is controlled in such a way that the voltage after boosting is a fixed value.

However, a problem exists in that the operating voltage of the solar battery is unstable when the generated power of the solar battery is relatively low.

The problem is due to a high boosting rate set by the booster circuit when the output voltage of the solar battery is low.

Figure 6:
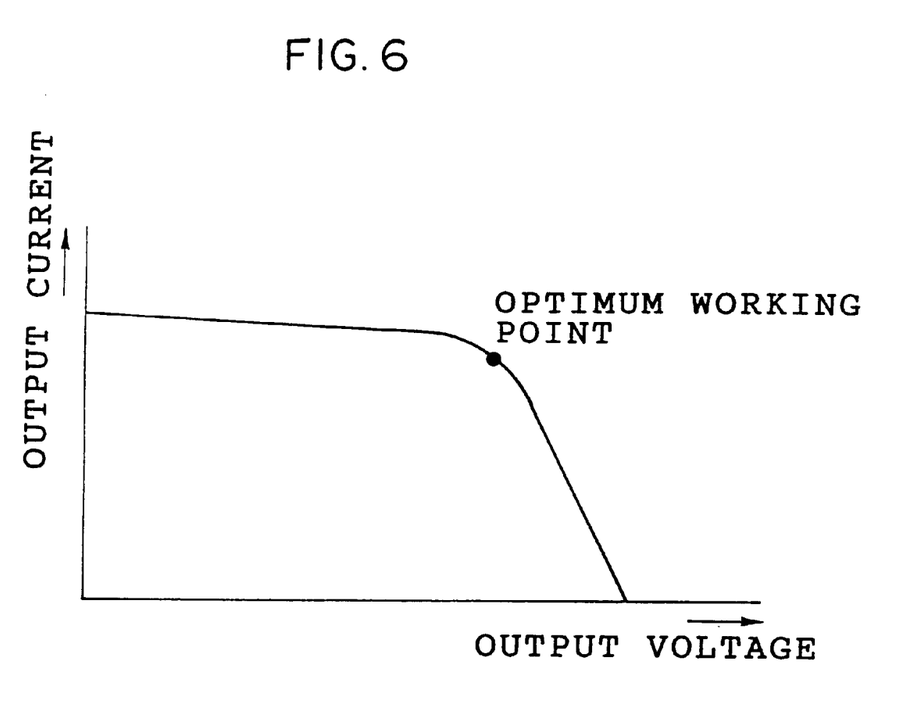
FIG. 6 is a characteristic view of the output voltage-output current of a solar battery used for describing the problems of a conventional technique.

More particularly the output voltage-output current characteristic of the solar battery is represented by a curve as shown in FIG. 6. Therefore, as the boosting rate of the booster circuit increases, the operating voltage of the solar battery shifts lower (to the left in FIG. 6), resulting in an unstable operating voltage for the solar battery.

Further, if the output voltage of the booster circuit, which is controlled in such a way that it is a fixed value, is set higher than necessary, there also arises a problem in that the conversion efficiency of the apparatus is decreased.

SUMMARY OF THE INVENTION

The present invention was made in order to solve the above problems, and an object of the present invention is to provide an apparatus for generating electric power by using sunlight which can always operate to an optimum level.

In order to achieve the above object, an apparatus for supplying AC power to a commercial power line by using sunlight is provided. The apparatus comprises a solar battery for generating DC power, a voltage booster for boosting the voltage of the DC power to a set target voltage, power converter means for converting the DC power into AC power having a predetermined frequency and a adding power and the AC power to the commercial line, and a voltage controller for setting the target voltage of the voltage booster based on the voltage of the AC power commercial power line wherein the voltage of the AC power from the converter is higher than the voltage of the AC power in the commercial power line.

According to an apparatus for supplying AC power to the commercial power line by using sunlight of the first aspect of the present invention, the voltage booster boosts the voltage of the DC power outputted from a solar battery to the set target voltage, and the power converter converts the DC power into AC power having a predetermined frequency and a voltage adding the AC power to the commercial power line.

At this point, the target voltage of the above voltage booster is set by the based on the AC power outputted from the power converter.

In this way, according to an apparatus for supplying AC power to the commercial power line by using sunlight of the first aspect of the present invention, as the target voltage of the voltage booster is set based on the voltage of the AC power from the commercial power line with added power from the converter means, the boosting rate of the voltage booster can be prevented from increasing more than necessary. Therefore, not only can the apparatus for supplying AC power to a commercial power line by using sunlight always operate with stability, but lowering of the conversion efficiency of the apparatus can be prevented without the need for setting the output voltage of the voltage booster higher than necessary.

In an apparatus for supplying AC power to the commercial power line by using sunlight of a second aspect of the present invention, an apparatus for supplying AC power to the commercial power line by using sunlight is provided as above, wherein the voltage controller sets the target voltage of the voltage booster in such a way that the target voltage is increased in accordance with the increase of the voltage of the AC power from the commercial power line.

According to an apparatus for supplying AC power to the commercial power line by using sunlight of the second aspect of the present invention, the target voltage of the voltage booster is set by the voltage controller in the apparatus for supplying AC power to the commercial power line by using sunlight of the first aspect of the present invention in such a way that the target voltage is increased in accordance with the increase of the AC power outputted from the power converter.

In this way, according to an apparatus for supplying AC power to the commercial power line by using sunlight of the second aspect of the present invention, as the target voltage of the voltage booster is set in such a way that the target voltage is increased in accordance with the increase of the AC power from the commercial power line with added power from the power converter, the boosting rate of the voltage booster can be prevented from becoming higher than necessary.

In an apparatus and a method for supplying AC power to commercial power line by using sunlight of a third aspect of the present invention, an apparatus for supplying AC power to a commercial power line by using sunlight is provided. The apparatus includes generating DC power, a voltage booster for boosting the voltage of the DC power to a set target voltage, a power converter for converting the DC power into AC power having a predetermined frequency and voltage adding the AC power to the commercial power line and a voltage controller for setting the target voltage of the voltage booster for the AC power from the commercial power line with power added from the power converter, wherein the voltage of the AC power outputted from the power converter is higher than the voltage of the commercial power.

In an apparatus method and apparatus for supplying AC power to commercial power line by using sunlight of a fourth aspect of the present invention, an apparatus for supplying AC power to a commercial power line by using sunlight is provided as described a Dove, wherein the voltage controller sets the target voltage of the voltage booster in such a way that the target voltage is increased in accordance with an increase of voltage of the commercial power.

DESCRIPTION OF THE PREFERRED EMBODIMENTS

An embodiment of an apparatus for supplying AC power to the commercial power line by using sunlight according to the present invention will be described in detail hereinafter with reference to the figures.

Figure 1:
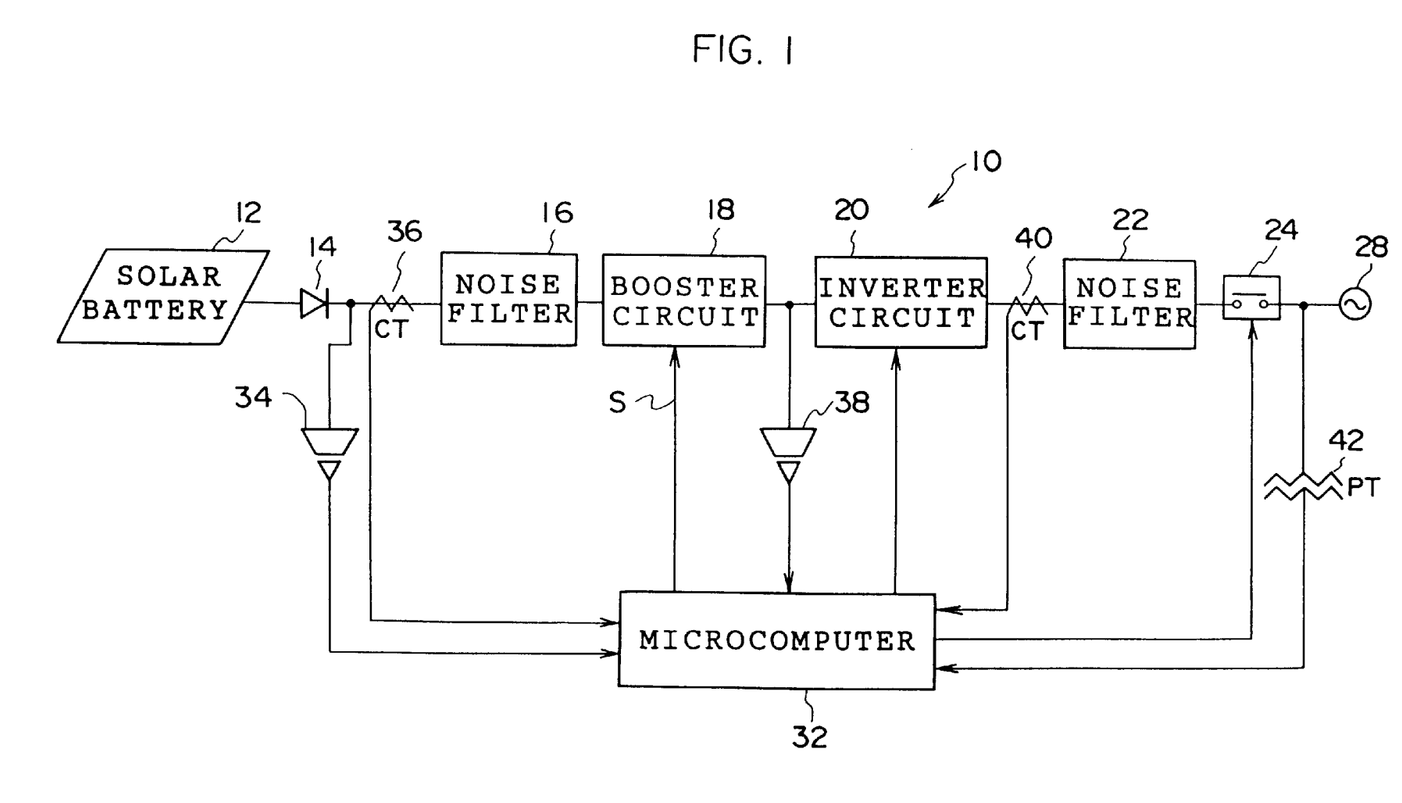
FIG. 1 is a block diagram illustrating the schematic structure of an apparatus for supplying AC power to a commercial power line by using sunlight according to a preferred embodiment of the present invention.

FIG. 1 is a block diagram illustrating the structure of an apparatus for supplying AC power to a commercial power line by using sunlight according to the present invention when applied as a system for interconnection within a commercial power system. As shown in the same figure, a solar battery 12 is provided for an apparatus for supplying AC power to a commercial power line by using sunlight 10 according to the present embodiment under discussion, and the output terminal of the solar battery 12 is connected to a direct current noise filter 16 via a diode 14 for preventing reverse current.

In addition, the output terminal of the noise filter 16 is connected to a booster circuit 18 for boosting inputted DC power based on a switching signal S inputted from a microcomputer 32, which will be described later. The output terminal of the booster circuit 18 is connected to an inverter circuit 20 for converting the inputted DC power into AC power having a predetermined frequency and adding it to the commercial power line, and the output terminal of the inverter circuit 20 is further connected to an alternating current noise filter 22. It should be noted that the inverter circuit 20 serves for converting the inputted DC power into AC power (the output of this inverter circuit 20 is in, for example, a sawtooth waveform) whose frequency is the same as that of commercial power (for example, 50 Hz or 60 Hz) on the basis of the switching signal inputted from the microcomputer 32. The structure of the booster circuit 18 will be described in detail later.

Furthermore, the output terminal of the noise filter 22 is connected to a commercial power system 28 via a parallel off conductor 24.

The apparatus for supplying AC power to the commercial power line by using sunlight 10 is equipped with a microcomputer 32 for controlling the whole apparatus for supplying AC power to the commercial power line by using sunlight 10. The following are inputted to the microcomputer 32 at a predetermined sampling cycle (0.5 seconds in the present embodiment): the output voltage of the solar battery 12 detected at a first voltage detection portion 34 consisting of an isolation amplifier; the output current of the solar battery 12 detected at a first current detection portion 36 consisting of a current transformer CT; the output voltage of the booster circuit 18 detected at a second voltage detection portion 38 consisting of an isolation amplifier; the output current of the inverter circuit 20 detected at a second current detection portion 40 consisting of a current transformer CT; and the voltage waveform of the commercial power system 28 detected at a voltage waveform detection portion 42 consisting of a potential transformer PT.

The microcomputer 32 is further connected to the parallel off conductor 24 so as to separate the inverter circuit 20 from the commercial power system 28 (parallel off) by opening a contact of the parallel off conductor 24 when the power outage of the commercial power system is detected.

The microcomputer 32 is also connected to the booster circuit 18 so as to control the duty ratio of a switching signal S inputted to the booster circuit 18 based on the output voltage of the booster circuit 18 detected at the second voltage detection portion 38 and the output current of the inverter circuit 20 detected at the second current detection portion 40.

Furthermore, the microcomputer 32 is connected to the inverter circuit 20 so as to generate and input to the inverter circuit 20 the switching signal, based on the voltage waveform of the commercial power system 28 detected at the voltage waveform detection portion 42, in such a way that the phase and frequency of the output power of the inverter circuit 20 match those of commercial power.

It should be noted that the booster circuit 18 corresponds to the voltage booster of the present invention, the inverter circuit 20 to the power converter of the present invention, and the microcomputer 32 to the voltage controller of the present invention, respectively.

Figure 2:
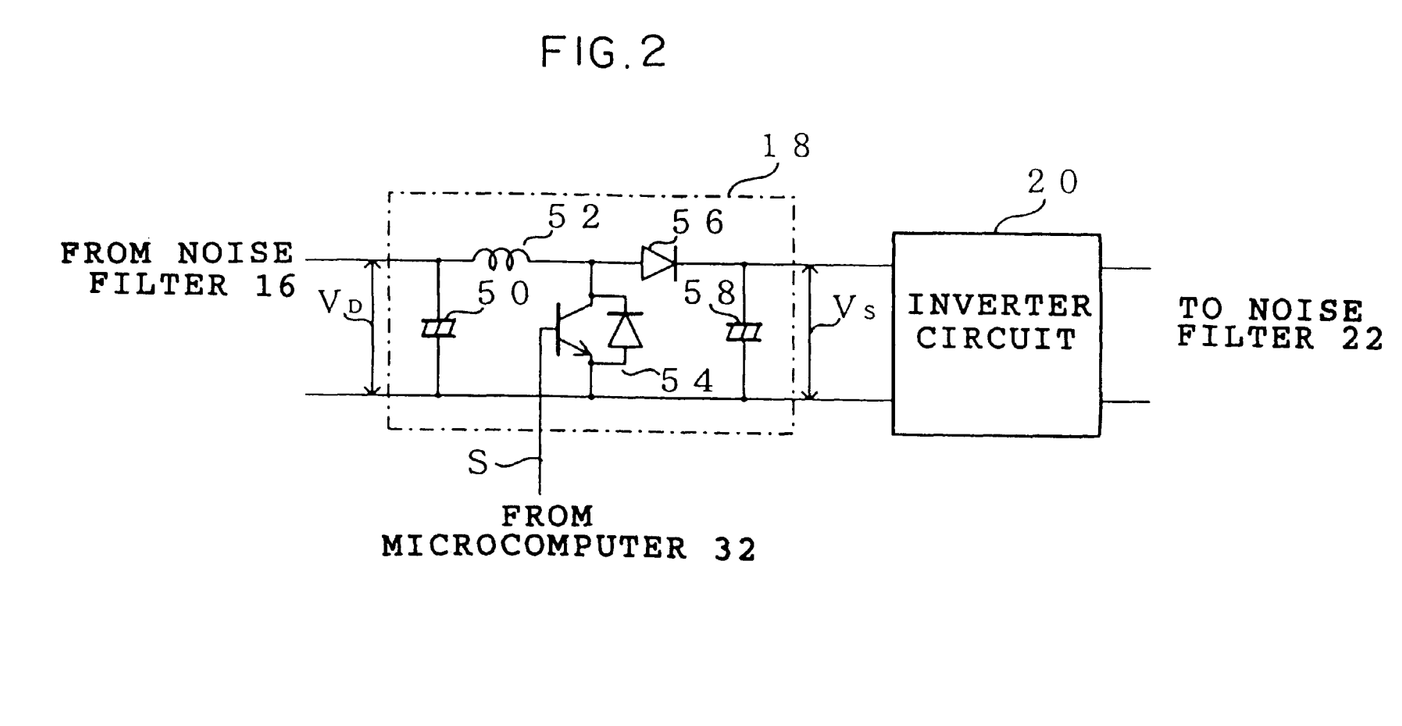
FIG. 2 is a block diagram illustrating in detail the structure of a booster circuit according to a preferred embodiment of the present invention.

Next, the structure of the booster circuit 18 will be described in detail with reference to FIG. 2. As shown in the same figure, the booster circuit 18 is provided with a smoothing capacitor 50 and a choking coil 52 for smoothing the DC power inputted from the noise filter 16, a switching circuit 54 composed of a switching element and a diode, and a diode 56 and a capacitor 58 connected so as to obtain a filter effect on the output side.

Namely, the booster circuit 18 comprises a boosting chopper circuit for boosting the output voltage Vs over the voltage $V_D$ applied from the noise filter 16, by utilizing the electromagnetic energy in the choking coil 52. As the switching element comprising the above switching circuit 54, a power transistor, a power FET, etc. can be applied.

Figure 3:
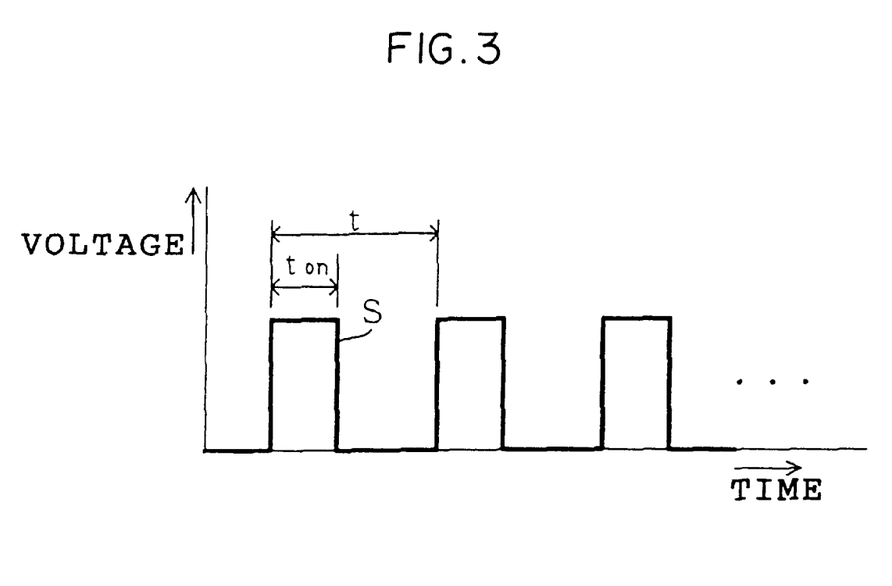
FIG. 3 is a timing chart used for describing the principle of operation of a booster circuit as well as illustrating the status of switching signals inputted to the booster circuit of FIG. 2.

Here, the mean value V of the output voltage Vs from the booster circuit 18 is obtained by the following formula (1) in accordance with the duty ratio of the switching signal S inputted to the switching element of the switching circuit 54 and shown in FIG. 3.

$$V = \frac{t}{t - t_{on}} V_D = \frac{1}{1-a} V_D \quad (1)$$

Generally, a ($=t_{on}/t$) in formula (1) is called the conduction ratio. As is evident from the above formula (1), the higher the ratio of the "on" duration $t_{on}$ to one cycle t of the switching signal S, or, in other words, the higher the duty ratio, the larger the mean value V of the output voltage $V_S$ from the booster circuit 18.

Figure 4:
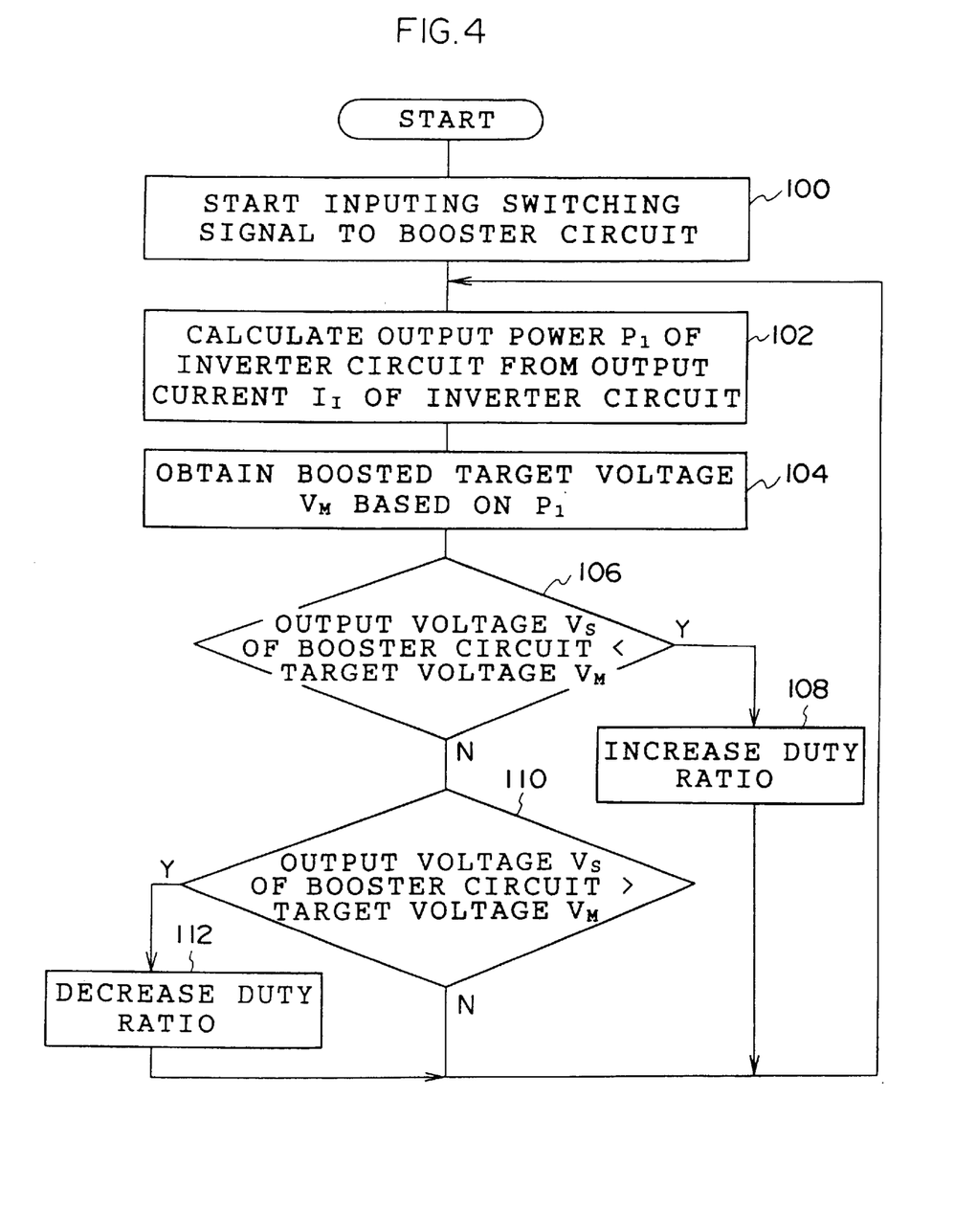
FIG. 4 is a flow chart illustrating the sequence of a control program conducted when a booster circuit is controlled by a microcomputer according to a preferred embodiment of the present invention.

Next, the operation of the booster circuit 18 in the apparatus for generating electric power by using sunlight 10 according to the present embodiment will be described with reference to FIG. 4, which is a flow chart of a control program conducted by the microcomputer 32 so as to control the booster circuit 18.

Figure 5A:
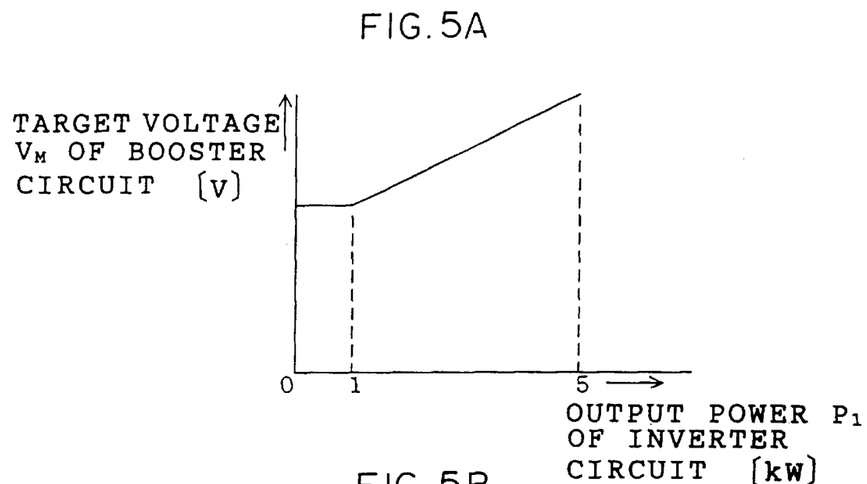
FIG. 5A is a graph illustrating one example of the relationship between the output power of an inverter circuit and the target voltage of a booster circuit according to a preferred embodiment of the present invention.

First, in step 100, the input of the switching signal S, whose duty ratio to the booster circuit 18 is 0, begins. Subsequently, the output voltage of the booster circuit 18 is increased by increasing gradually the duty ratio of the switching signal S. When the output voltage reaches the predetermined target voltage, the operation of the inverter circuit 20 begins, and then the process moves to step 102. It should be noted that the predetermined target voltage at this point corresponds to the target voltage at the point that the output voltage $P_1$ of the inverter circuit 20 in the graph of FIG. 5A is 0.

In the subsequent step 102, the output power $P_1$ ($=I_i \times$the voltage of the commercial power) of the inverter circuit 20 is calculated based on the output current $I_I$ of the inverter circuit 20 detected at the second current detection portion 40.

In the subsequent step 104, the target voltage $V_M$ after boosting by the booster circuit 18 is obtained based on the output power $P_1$. At this point, the target voltage $V_M$ is obtained in such a way that the relation between the output power $P_1$ of the inverter circuit 20 and the target voltage $V_M$ is as shown in FIG. 5A. Namely, the target voltage $V_M$ is a fixed value when the output power $P_1$ of the inverter circuit 20 is from 0 through 1 [kW], and is increased in accordance with the increase of the output power $P_1$ when the output power $P_1$ is higher than 1 [kW]. It should be noted that the target voltage $V_M$ at this point can be specifically obtained by applying a method of storing in advance in an unillustrated memory of the microcomputer 32 a table of the output power $P_1$ of the inverter circuit 20 and the target voltage $V_M$ of the booster circuit 18 which establish a relation as shown in FIG. 5A, and referring to the table, etc. Moreover, the above value, 1 [kW], is merely one example, and the present invention is not limited to this value.

In the subsequent step 106, a determination is made as to whether the output voltage $V_S$ of the booster circuit 18 detected at the second voltage detection portion 38 is lower than the target voltage $V_M$ or not. If the output voltage $V_S$ is lower, the process moves to step 108, where the duty ratio of the switching signal S, which is being inputted to the boosting circuit 18, is increased in such a way that the output voltage $V_S$ of the booster circuit 18 is the target voltage $V_M$. Then, the process returns to step 102.

On the other hand, in step 106, if it is determined that the output voltage $V_S$ of the booster circuit 18 is not lower than the target voltage $V_M$, the process moves to step 110 where the determination is made as to whether the output voltage $V_S$ is higher than the target voltage $V_M$ or not. If the output voltage $V_S$ is higher, the process moves to step 112 where the duty ratio of the switching signal S is decreased in such a way that the output voltage $V_S$ of the booster circuit 18 is the target voltage $V_M$. Then, the process returns to step 102.

Then, in step 110, if it is determined that the output voltage $V_S$ of the booster circuit 18 is not higher than the target voltage $V_M$, that is, if the output voltage $V_S$ is equal to the target voltage $V_M$, the process returns to step 102 without changing the duty ratio of the switching signal S.

From this point on, by repeating the processing from step 102 through step 112 described above, the booster circuit 18 is controlled in such a way that the output voltage $V_S$ establishes the relationship shown in FIG. 5A in accordance with the value of the output power $P_1$ of the inverter circuit 20.

In this way, in the apparatus for supplying AC power to the commercial power line by using sunlight 10 according to the present embodiment, as the output voltage $V_S$ of the booster circuit 18 is changed in accordance with the value of the output power $P_1$ of the inverter circuit 20, the boosting rate of the boosting circuit 18 does not become higher than necessary. Therefore, not only can the apparatus for supplying AC power to the commercial power line by using sunlight 10 always operate with stability, but the conversion efficiency of the apparatus is not lowered without the need for setting the output voltage $V_S$ of the booster circuit 18 higher than necessary.

The boosted voltage is controlled by the output of the system voltage and the power conditioner. The higher the boosting rate is, the more loss the booster circuit generates, resulting in decreased conversion efficiency. Therefore, when the system voltage is high (the generated power is large), the boosted voltage is increased. In contrast, when the system voltage is low (the generated power is small), the boosted voltage is controlled in such a way that it remains low.

Figure 7:
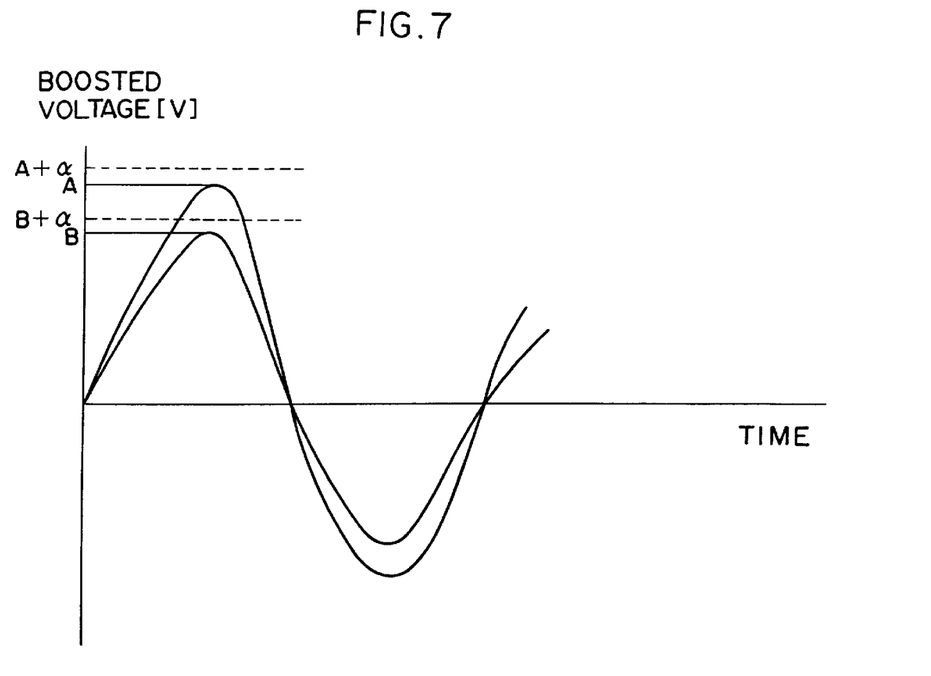
FIG. 7 is a timing chart of the boosted voltage of a conventional apparatus.

The boosting efficiency of the boosting means is lessened as the boosting ratio is increased. Thus, a small boosting ratio is generally preferred. However, when the power is superimposed on the system, the output voltage of the conversion means must be higher than the system voltage by +α or more. Otherwise, the efficiency of superimposition is decreased. Further, since changes in boosted voltages vary depending on the system voltage and the loads as A and B shown in FIG. 7, the target voltage is inevitably set higher, allowing for these variations. Thus, it is conventionally conditioned that the boosting ratio is set higher than required.

The present invention prevents unnecessary boosting by controlling the output of the converter in such a way that it is constantly +α (V). Further, as the system voltage varies depending on the output amount from the converter, the target voltage may be changed in accordance with the output amount.

Figure 5B:
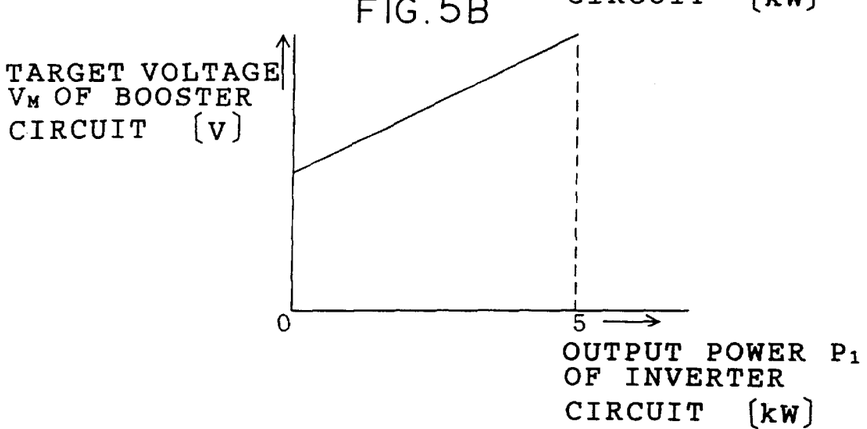
FIG. 5B is a graph illustrating another example of the relationship between the output power of an inverter circuit and the target voltage of a booster circuit.
Figure 5C:
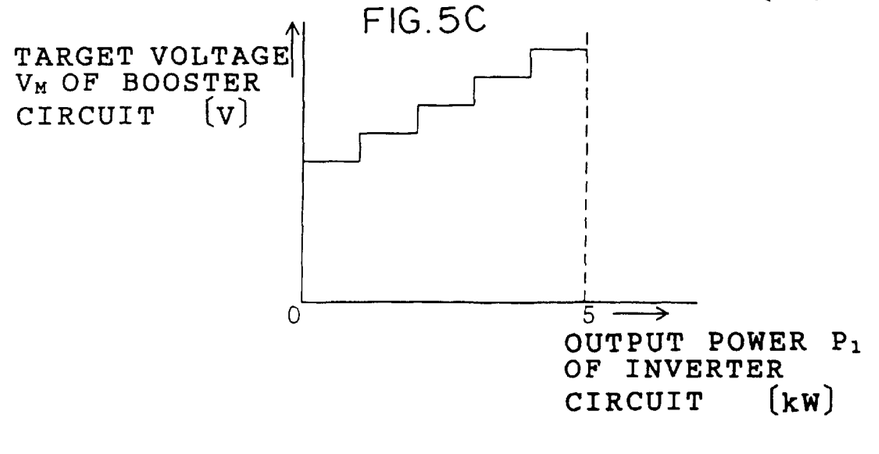
FIG. 5C is a graph illustrating a further example of the relationship between the output power of an inverter circuit and the target voltage of a booster circuit.

In the description of the present embodiment, the output voltage $V_S$ of the booster circuit 18 is obtained in such a way that the output voltage $V_S$ establishes the relationship shown in FIG. 5A in accordance with the output power $P_1$ of the inverter circuit 20. However, the present invention is not limited to this. For example, as shown in FIG. 5B, the output voltage $V_S$ may be increased rectilinearly in accordance with the increase of the output power $P_1$ of the inverter circuit 20, or as shown in FIG. 5C, the output voltage $V_S$ may increase stepwise in accordance with the increase of the output power $P_1$ of the inverter circuit 20. These examples can produce a substantially similar effect to that of the present embodiment.

In the description of the present embodiment, a boosting chopper circuit (a direct-type booster circuit) is applied as the booster circuit 18. However, the present invention is not limited to this. A booster circuit using a voltage doubler rectifier circuit, a serial-parallel chopper circuit, or the like may be applied.

According to an apparatus for supplying AC power to a commercial power line by using sunlight, in first aspect of the present invention, as the target voltage of the voltage booster is set based on the AC power outputted from the voltage converter, an effect is obtained that the boosting rate of the voltage booster can be prevented from becoming larger than necessary. Therefore, not only can the apparatus for supplying AC power to a commercial power line by using sunlight always operate with stability, but the lowering of conversion efficiency of the apparatus can be prevented without the need for setting the output voltage of the voltage booster higher than necessary.

Similarly, according to an apparatus for supplying AC power to a commercial power line by using sunlight, in a second aspect of the present invention, as the target voltage of the voltage booster is set in such a way that the target voltage is increased in accordance with the increase of the voltage of AC power from the commercial power line, an effect is obtained that the boosting rate of the voltage booster can be prevented from becoming higher than necessary.

What is claimed is:

1. An apparatus for supplying AC power to a commercial power line by using sunlight, comprising:
    a solar battery for generating DC power;
    a voltage booster for boosting the voltage of the DC power to a target voltage;
    a power converter for converting the DC power whose voltage has been boosted by said voltage booster, into AC power having a predetermined frequency and a voltage and adding said AC power to the commercial power line; and
    a voltage controller for setting the target voltage of said voltage booster based on the voltage of the AC power in the commercial power line, wherein the voltage of the AC power from said power converter is higher than the voltage of the AC power in the commercial power line.

2. An apparatus for supplying AC power to a commercial power line by using sunlight as claimed in claim 1, wherein said voltage controller sets the target voltage of said voltage booster in such a way that the target voltage is increased in accordance with an increase in the voltage of the AC power in the commercial power line.

3. An apparatus for supplying AC power to a commercial power line by using sunlight as claimed in claim 1, wherein said voltage controller sets the target voltage of said voltage booster in such a way that the target voltage is a fixed value when the voltage of the AC power in the commercial power line is from 0 through a predetermined value and the target voltage is increased in accordance with an increase in the voltage of the AC power in the commercial power line when the AC power in the commercial power line is higher than the predetermined value.

4. An apparatus for supplying AC power to a commercial power line by using sunlight as claimed in claim 2, wherein said voltage controller sets the target voltage of said voltage booster in such a way that the target voltage is increased rectilinearly in accordance with the increase of the voltage of AC power in the commercial power line.

5. An apparatus for supplying AC power to a commercial power line by using sunlight as claimed in claim 2, wherein said voltage controller sets the target voltage of said voltage booster in such a way that the target voltage is increased stepwisely in accordance with the increase of the voltage of AC power in the commercial power line.

6. An apparatus for supplying AC power to a commercial power line by using sunlight as claimed in claim 1, wherein said voltage controller stores in a memory within said voltage controller a table of the output voltage of said power converter and the target voltage of said voltage booster and refers to the table in order to obtain the target voltage.

7. An apparatus for supplying AC power to a commercial line by using sunlight as claimed in claim 2, wherein said voltage controller stores in a memory within said voltage controller a table of the output voltage of said power converter and the target voltage of said voltage booster, and refers to the table in order to obtain the target voltage.

8. An apparatus for supplying AC power to a commercial power line by using sunlight as claimed in claim 3, wherein said voltage controller stores in a memory within said voltage controller a table of the output voltage of said power converter and the target voltage of said voltage booster, and refers to the table in order to obtain the target voltage.

9. An apparatus for supplying AC power to a commercial power line by using sunlight as claimed in claim 4, wherein said voltage controller stores in a memory within said control means a table of the output voltage of said power converter and the target voltage of said voltage booster, and refers to the table in order to obtain the target voltage.

10. An apparatus for supplying AC power to a commercial power line by using sunlight as claimed in claim 5, wherein said voltage controller stores in a memory within said voltage controller a table of the output voltage of said power converter and the target voltage of said voltage booster, and refers to the table in order to obtain the target voltage.

11. An apparatus for supplying AC power to a commercial power line by using sunlight, comprising:
    a solar battery for generating DC power;
    a voltage booster for boosting the voltage of the DC power to a target voltage;
    a power converter for converting the DC power whose voltage has been boosted by said voltage booster, into AC power having a predetermined frequency and a voltage and adding said AC power to the commercial power line; and
    a voltage controller for setting the target voltage of said voltage booster based on the voltage of the AC power in the commercial power line, wherein the voltage of the AC power outputted from said power converter is higher than the voltage of the commercial power line.

12. An apparatus for supplying AC power to a commercial power line by using sunlight as claimed in claim 11, wherein said voltage controller sets the target voltage of said voltage booster in such a way that the target voltage is increased in accordance with an increase of the voltage of the commercial power.

13. A method of supplying AC power to a commercial power line by using sunlight, comprising:
    a boosting step which boosts the voltage of DC power to a target voltage;

a power conversion step which converts the DC power from said boosting step into AC power having a controlled predetermined frequency and adds the AC power from the conversion step to the commercial power line; and a control step which sets the target voltage of said boosting step based on the AC power in the commercial power line, wherein the voltage of the AC power outputted from said power conversion step is higher than the voltage of the AC power in the commercial power line.

14. A method of supplying AC power to a commercial power line by using sunlight as claimed in claim 13, wherein said control step sets the target voltage of said boosting step in such a way that the target voltage is increased in accordance with an increase of the voltage of the AC power in the commercial power line.

15. A method of supplying AC power to a commercial power line by using sunlight as claimed in claim 13, wherein said control step sets the target voltage of said boosting step in such a way that the target voltage is a fixed value when the voltage of the AC power in the commercial power line is from 0 through a predetermined value and the target voltage is increased in accordance with an increase of the voltage of the AC power in the commercial power line when the AC power in the commercial power line is higher than the predetermined value.

16. A method of supplying AC power to a commercial power line by using sunlight as claimed in claim 14, wherein said control step sets the target voltage of said boosting step in such a way that the target voltage is increased rectilinearly in accordance with the increase of the voltage of the AC power in the commercial power line.

17. A method of supplying AC power to a commercial power line by using sunlight as claimed in claim 14, wherein said control step sets the target voltage of said boosting step in such a way that the target voltage is increased stepwisely in accordance with the increase of the voltage of the AC power in the commercial power line.

* * * * *